United States Patent [19]
Leonard

[11] 4,041,828
[45] Aug. 16, 1977

[54] CHORD FINGERING COORDINATOR

[76] Inventor: Verna M. Leonard, 8701 Highway 41, Fresno, Calif. 93710

[21] Appl. No.: 655,702

[22] Filed: Feb. 6, 1976

[51] Int. Cl.² .............................................. G09B 15/02
[52] U.S. Cl. .................................. 84/471 R; 84/478; 84/485 R
[58] Field of Search ....... 84/471 R, 471 SR, 473–475, 84/478–482, 485

[56] References Cited

U.S. PATENT DOCUMENTS

| 741,017 | 10/1903 | Curtiss | 84/480 |
|---|---|---|---|
| 3,101,023 | 8/1963 | Weis | 84/482 |
| 3,350,973 | 11/1967 | Weis et al. | 84/478 |
| 3,728,931 | 4/1973 | Leonard | 84/478 |
| 3,733,956 | 5/1973 | Leonard | 84/480 |
| 3,903,781 | 9/1975 | Leonard | 84/474 |

*Primary Examiner*—Stephen J. Tomsky
*Attorney, Agent, or Firm*—Ralph S. Branscomb

[57] ABSTRACT

The invention is a teaching and practicing aid for music students which graphically displays the relationship of the dominant, tonic, and subdominant scales in a particular key signature and as they relate to the diatonic scale in that key signature, the device structurally comprising a backing sheet optionally having the scale tones of a diatonic scale named in a row along the bottom, and three preferably reversible panels disposed in staggered horizontal slits cut in the backing sheet, these panels having portions visible above the slit with indicia thereon indicating by fingering number or scale tone name musical notes representing chords or scales, these notes being spaced proportionally to the key spacing of a piano keyboard. There is an optional insert card having two selectively displayable portions which represent the left and right hand, respectively, with the fingers thereof numbered in accordance with conventional elementary teaching techniques.

8 Claims, 8 Drawing Figures

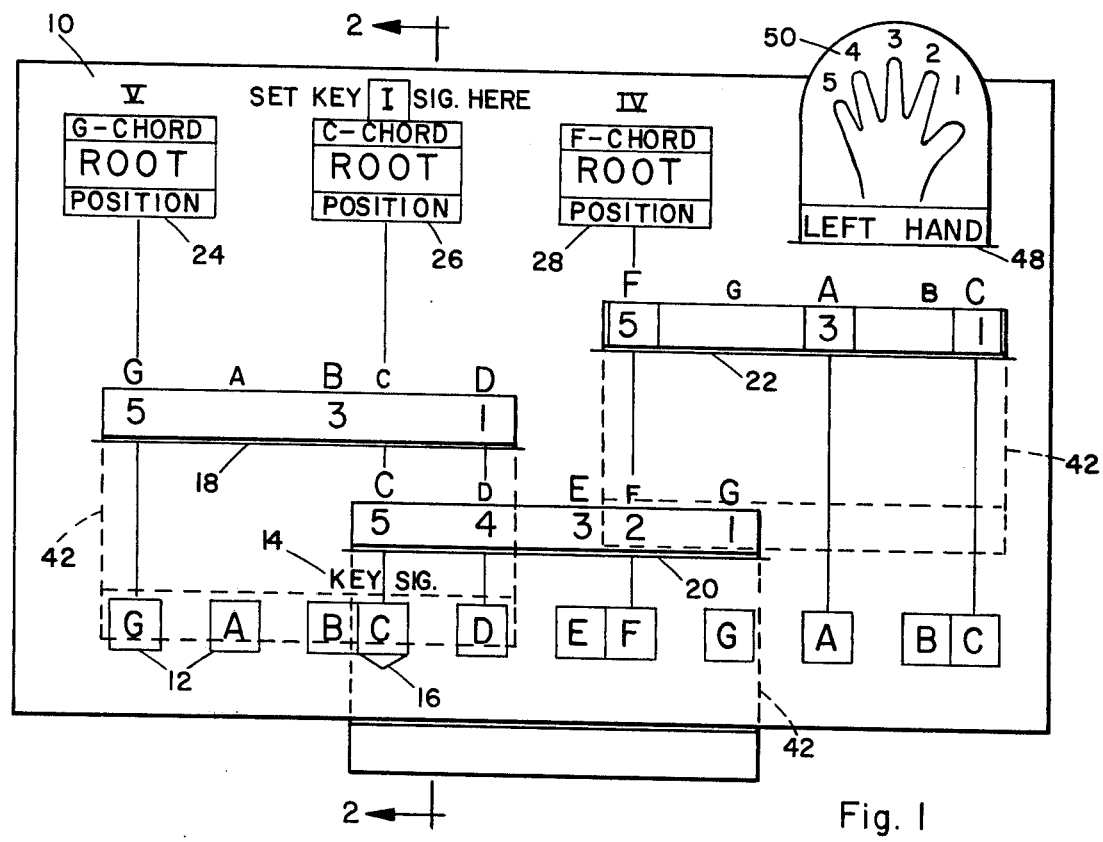
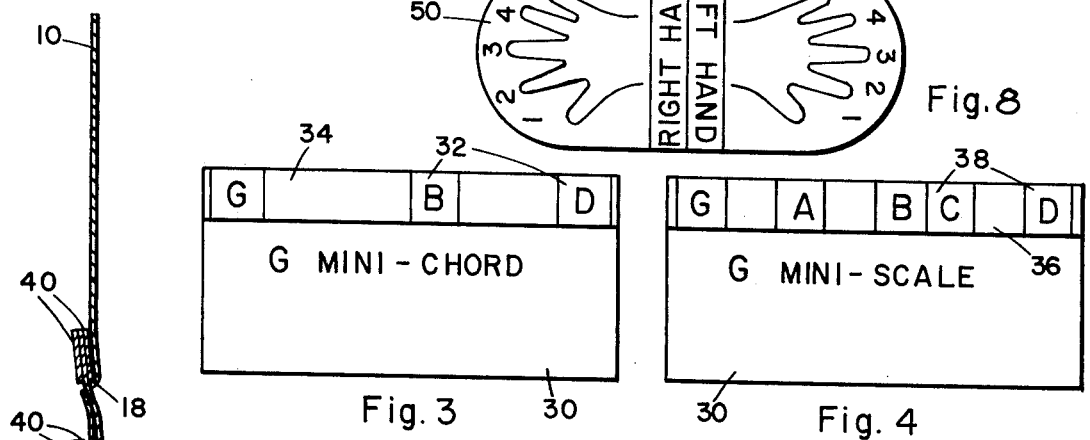
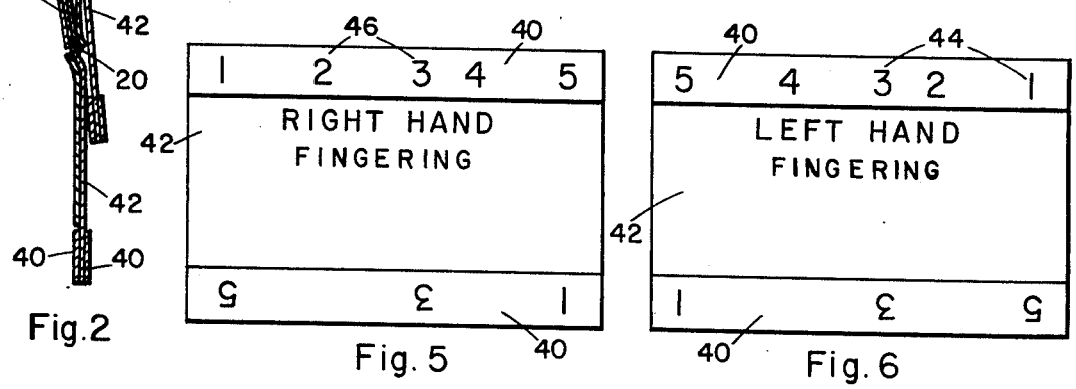

CHORD FINGERING COORDINATOR

BACKGROUND OF THE INVENTION

One of the difficulties encountered by the beginning music student is understanding the inter-relationship of chords and scales and particularly comprehending the structure of certain chords which ordinarily occur in a given sequence in music composition. These difficulties are encountered at least in part because in conventional music instruction, the student is simply shown the correspondence between a particular note or set of notes on a score and the related keys on the keyboard without attaining any general comprehension of the structure of music behind the rote fingering. It is therefore encumbent upon the student to memorize chord after chord and multiple scales and the notes of musical scores which correspond to the keys to be used to play these chords and scales without the benefit of an overall framework within which to work.

There is need for a musical teaching aid which displays in graphic form the relationship of the tonic, subdominant and dominant chords and scales as related to a particular key signature so that the student may understand the overlapping nature and fixed structure of these important related chords and scales.

SUMMARY OF THE INVENTION

The invention comprises a backing sheet provided with staggered horizontal slits in which are inserted panels having displayed thereon indicia indicating the notes of chords or scales to be played by the student on a keyboard instrument. These panels are preferably reversible, and in one embodiment the scale tone names of a triad are indicated along one edge, and along another edge a scale is displayed, and it is preferable that three slits and three panels be provided to represent the tonic, subdominant and dominant scales.

The triads and scales may be indicated on the panels by means of numbers corresponding with the fingers to be used to play the triad or scale, and an insert card having selectively exposeable left and right hands with the fingers numbered may be provided to indicate to a student which hand will be used for a particular exercise.

BRIEF DESCRIPTION OF THE DRAWINGS

FIG. 1 is a front elevation view of the device set up for use;

FIG. 2 is a sectional view taken along line 2—2 of FIG. 1;

FIG. 3 is a detail of one form of insert panel;

FIG. 4 is a rear elevation view of the insert panel illustrated in FIG. 3;

FIG. 5 is a front elevation view of a modified form of insert panel;

FIG. 6 is a rear elevation view of the insert panel illustrated in FIG. 5; and

FIG. 8 is a view of card 50.

DETAILED DESCRIPTION OF THE PREFERRED EMBODIMENT

Figure 7:
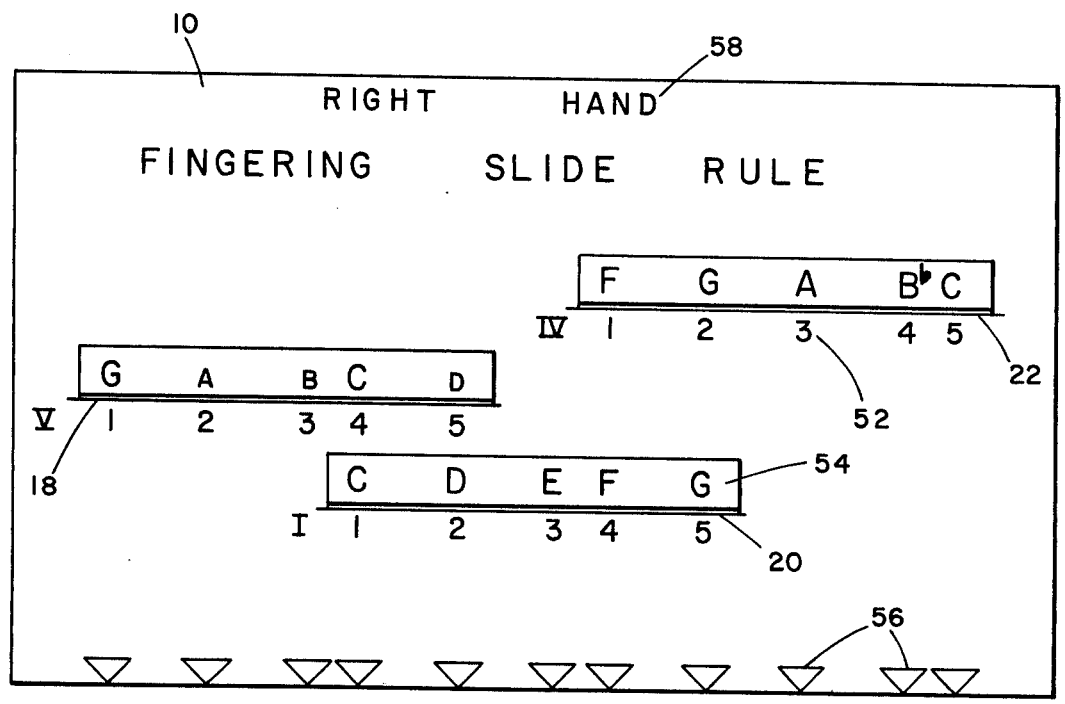
FIG. 7 is a front elevation view of a modification of the invention.

The invention is best shown in FIG. 1, wherein a base member or backing sheet 10, composed of stiff paper or plastic, is provided with a row of scale tones 12 preferably along the bottom which form a chromatic scale, in the illustrated embodiment the chromatic scale being in the key of C, as indicated at 14 and by the Delta provided beneath the scale tone C at 16. It is preferred that the spacing of the scale tones in the row 12 be such that the individual named scale tones will register with the corresponding keys of a piano keyboard when the backing sheet 10 is inserted behind the keys.

Above the row 12 are three parallel slits 18, 20, and 22, the direction of which will be taken as horizontal for the purpose of this specification and the appended claims, although clearly the device would work in any orientation. It is clear from FIG. 1 that these slits overlap horizontally and that slit 18 encompasses in vertical registration the scale tones G through D of the diatonic scale and the slits 20 and similarly encompass a series of scale tones in the diatonic scale displayed in row 12. It will also be noted that the beginning scale tone encompassed by each slit is tagged by indicia 24, 26, and 28, respectively, which indicates the name of the chord when the respective scale tone is used as the root of a triad, as well as the Roman numeral above each chord name which identifies the position of the root scale tone in the cycle of fourths.

Although the teaching aid could be used to familiarize the student with the chord structure of any chord or scale occupying a given portion of a chromatic scale, in the present embodiment, it is intended that the tonic, dominant, and subdominant chords and their respective scales be emphasized as they relate to the diatonic scale of the chosen key signature. There are thus provided a series of panels which are inserted in the slits 18-22 which are provided with indicia visible above the respective slits which register with selected scale tones from the row 12 to form chords and scales in the tonic, dominant, and subdominant modes.

One form of the panel 30 is shown in FIG. 3 wherein scale tones G, B, and D indicated at 32 are provided along a strip 34 to indicate that the G Major triad should be played when the panel 30 is inserted into the slit 18. The scale tones 32 are in vertical alignment with their counterparts in the diatonic scale 12 and serve to reiterate the individual scale tones which appear in the triad. The reverse side of the panel 30 is shown in FIG. 4 wherein a strip 36 is provided which has a scale 38 displayed thereon which is the first portion of the dominant scale in the key of C. The strips 34 and 36 engage the bottom edge of the slit 18 so that the panel will not fall through, and it can be seen that by simply reversing the panel, the student can switch from a G triad to a G "mini-scale", both being dominant to the key of C.

Two other panels, not shown, are used in the slits 20 and 22 which are identical to the panel 30 except that the scale tones comprising the triad and mini-scale are those relating to the tonic and subdominant modes as opposed to the dominant represented on panel 30. By using these three panels, of which panel 30 is representative, the student may drill in the tonic, dominant, and subdominant modes in both chords and scales on the keyboard while the teaching aid establishes a reference framework so that while he is playing, the structure and inter-relationships of these chords and scales are fixed in his mind.

FIGS. 5 and 6 represent the front and reverse side of a modification of the panel shown in FIGS. 3 and 4 in which strips 40 are adhered to the top and bottom, front and rear, of the panel 42. One side of the panel is related to the right hand fingering of the triad and mini-chord explained in FIGS. 3 and 4 and the other side relates the same information in the left hand. Unlike panel 30 the panel 42 can be duplicated, there ordinarily being three required, and used in all three of the slits. When exercising in the bass region of the keyboard, the left hand fingering sides of the panels would be forward and the numbers 44 each correspond to one finger on the hand and indicates to the student which finger should be used to play the scale tone in the chromatic scale with which the number registers. The fingers of the right hand are numbered in reverse order from the left hand, and the scales and triads played in the right hand would thus have reversed numbers as at 46. By turning the panels 42 upside down, the student changes between mini-scales and triads as with the panels 30.

A fourth slit 48 may be used to insert a card 50 which is divided into two portions, representing the left and right hands having the fingers thereon numbered according to conventional elementary music teaching techniques. This card is used in conjunction with the panels 42 to remind the student of the proper numbering of the fingers. The transition from the hand, through the scale tone names of the notes, and then to the keys on a piano keyboard is complete.

A modification of the invention is illustrated in FIG. 7, in which the base member or backing sheet 10 and slits 18 are similar to the previously described embodiment. The side of the backing sheet shown is directed toward the right hand as indicated at 58 and beneath each of the slits are the finger numbers 52 which are to be used to play the scale displayed on the cards 54. The backing sheet is reversible, and the rear side would be similarly arranged but directed toward the left hand so that the numbers indicated at 52 would be reversed. At the bottom of the backing sheet are a plurality of indicators 56 which are spaced to register with a diatonic scale on the piano keyboard so that a single backing sheet 10 can be used in any key signature and reversed to switch from bass to treble, so that only the insert cards need be presented as a set representing different key signatures, and the base member is universally applicable.

The teaching aid can of course be used in all key signatures which would require a different backing sheet and a different set of panels 30, and as previously mentioned, relationships between other chord types and those proposed above could be emphasized, such as the minor chord and scale structure. The primary feature and advantage of the teaching aid is to permit the student to drill in a group of related chords and scales on a piano keyboard, the drilling being directed by the teaching aid to establish a framework within which the student is working as well as the structural relationships of the chords and scales used.

I claim:

1. A multiple chord and scale integrator compising:
  a. a backing sheet having displayed thereon the consecutive scale tones of a diatonic scale;
  b. said backing sheet having a plurality of vertically staggered and horizontally overlapping mounting means; and
  c. a plurality of panels removably mounted in said mounting means, each of said panels having indicia thereon to register with selected ones of said scale tones of said diatonic scale to indicate a particular chord or scale to be played from said diatonic scale.

2. Structure according to claim 1 wherein said panels are three in number and the indicia thereon indicate with scale tones in said diatonic scale representing the dominant, tonic, and subdominant scales, respectively, of said diatonic scale.

3. Structure according to claim 1 wherein said mounting means comprise a plurality of horizontal slits and said panels are inserted into said slits.

4. Structure according to claim 3 wherein the indicia on each of said panels comprises numbers corresponding to the fingers to be used to play a particular chord or progression, said number being in vertical registry with the scale tones of said particular chord or progression.

5. Structure according to claim 4 wherein each of said panels is provided on one side with numbers corresponding to the left hand digits to be used to play particular notes, and is provided on the other side with numbers corresponding to the right hand digits to be used to play particular notes.

6. Structure according to claim 4 and including an insert card removably mounted on said base member, said card having one portion displaying a left hand with numbered fingers and another portion displaying a right hand with numbered fingers, the portions of said panel being selectively exposable so that only one of said hands is visible at a time.

7. Structure according to claim 1 wherein each of said panels has a first row of numbers along one edge thereof corresponding to the fingers to be used to play a particular scale and a second row of numbers along another edge thereof corresponding to the fingers to be used to play a chord within the scale selected by said first row such that a scale or chord may be selectively indicated by said panel.

8. Structure according to claim 7 wherein each of said panels has a pair of reinforcing strips extended along opposite edges of one face thereof and said first and second rows of numbers are disposed along respective ones of said strips in mutually upside-down relationship, whereby said panels are reversible and said strips engage the portions of said base member beneath said slits when said panels are inserted therein.

* * * * *